US012684212B2

(12) United States Patent
Iwata et al.

(10) Patent No.: US 12,684,212 B2
(45) Date of Patent: *Jul. 14, 2026

(54) IMAGING APPARATUS AND CONTROL METHOD THEREFOR

(71) Applicant: CANON KABUSHIKI KAISHA, Tokyo (JP)

(72) Inventors: Sairi Iwata, Kanagawa (JP); Yuya Sasaki, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

This patent is subject to a terminal disclaimer.

(21) Appl. No.: 18/629,232

(22) Filed: Apr. 8, 2024

(65) Prior Publication Data

US 2024/0348902 A1      Oct. 17, 2024

(30) Foreign Application Priority Data

Apr. 13, 2023      (JP) ................................. 2023-065731

(51) Int. Cl.
| | |
|---|---|
| *H04N 23/53* | (2023.01) |
| *G01P 15/18* | (2013.01) |
| *H04N 23/63* | (2023.01) |

(52) U.S. Cl.
CPC ........... *H04N 23/531* (2023.01); *G01P 15/18* (2013.01); *H04N 23/63* (2023.01)

(58) Field of Classification Search
CPC ....... H04N 23/531; H04N 23/63; G01P 15/18
See application file for complete search history.

(56) References Cited

U.S. PATENT DOCUMENTS

| | | | |
|---|---|---|---|
| 7,440,003 B2 | 10/2008 | Shimamura | |
| 8,416,333 B2 | 4/2013 | Nakai | |
| 9,131,131 B2 | 9/2015 | Ishikawa | |
| 11,838,632 B2 | 12/2023 | Maniwa | |
| 12,075,163 B2 | 8/2024 | Kumarasamy | |
| 2005/0248678 A1 | 11/2005 | Kawai | |
| 2006/0148540 A1 | 7/2006 | Satoh | |
| 2007/0298850 A1 | 12/2007 | Miyata | |
| 2008/0256751 A1 | 10/2008 | Hirose | |
| 2009/0295975 A1 | 12/2009 | Takahashi | |
| 2010/0144405 A1 | 6/2010 | Hakamata | |
| 2012/0045196 A1* | 2/2012 | Takahashi | H04N 23/51 396/374 |
| 2012/0081593 A1 | 4/2012 | Nakagawa | |
| 2013/0050557 A1 | 2/2013 | Moriyasu | |
| 2013/0113466 A1 | 5/2013 | Hirayama | |
| 2015/0125140 A1 | 5/2015 | Ashizawa | |
| 2022/0170245 A1* | 6/2022 | Hamakawa | G01C 9/06 |
| 2024/0348902 A1 | 10/2024 | Iwata | |

FOREIGN PATENT DOCUMENTS

JP      2012105069 A      5/2012

* cited by examiner

*Primary Examiner* — Christopher K Peterson
(74) *Attorney, Agent, or Firm* — Canon U.S.A., Inc. IP Division

(57)      ABSTRACT

An imaging apparatus can include an angle calculation unit configured to calculate attitude angles of a main body unit and a display unit from gravitational accelerations acquired from a first acceleration sensor and a second acceleration sensor, and switches a calculation method of the attitude angles to be calculated by the angle calculation unit based on a vibration state detected by a vibration detection unit.

8 Claims, 10 Drawing Sheets

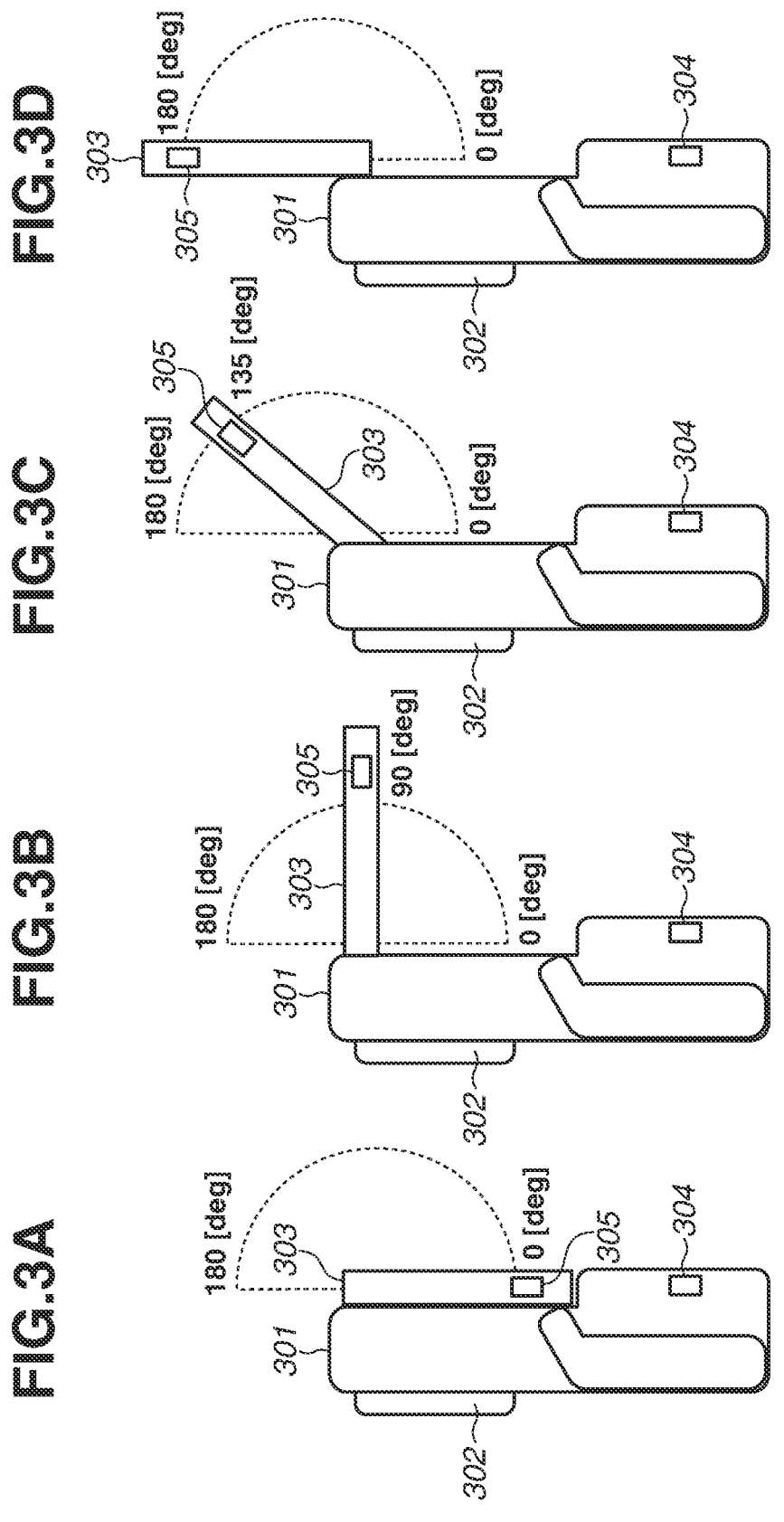

Display State: | Normal Display | Reversal Display | Normal Display |

701

Angle [deg]

702

T0    T1    T2

Time [s]

———— Display unit angle    – – – – Main body unit angle

Display State: Normal Display

703

705

Angle [deg]

706

704

T0    T1    T2

Time [s]

———— Display unit angle
—··—··— Display unit angle when vibration-large filter is applied – – – – Main body unit angle
—··—··— Main body unit angle when vibration-large filter is applied

IMAGING APPARATUS AND CONTROL METHOD THEREFOR

BACKGROUND

Field

The present disclosure relates to an imaging apparatus including a rotatable display unit, and a control method for the imaging apparatus.

Description of the Related Art

There are many cameras (imaging apparatuses) each including a rotatable display unit, and a display of the display unit of such a camera is switched between a "normal display" and a "reversal display" (reversed in up-down direction and right-left direction) depending on an open/close angle of the display unit.

A magnetic detection method is used to detect an open/close state of a conventional display unit.

With the magnetic detection method, an angle at which the display is switched is predetermined, and when the predetermined angle is reached, a sensor responds to a magnetic field to switch display directions.

Japanese Patent Application Laid-Open No. 2012-105069 discusses a case where a first housing and a second housing are supported with a hinge to be openable and closable relative to each other, and an open/close state is determined using a magnetic field generation member and a magnetic detection unit.

In the magnetic detection method, there is a case where a user does not want the reversal display even if the open/close angle of the display unit has reached the predetermined angle at which the display is switched, depending on a use state of the camera.

On the other hand, there is a case where a user wants the reversal display even if the open/close angle of the display unit has not reached the predetermined angle at which the display is switched. In other words, there may be a case where the display is not a display desired by the user in an intermediate state between the opened and closed states.

To address this issue, it is possible to calculate the intermediate state of the open/close angle by mounting acceleration sensors respectively on the camera body and the display unit.

In this way, it is possible to solve the issue of the magnetic detection method by switching the displays depending on the intermediate state.

However, there is a case where a correct open/close angle cannot be calculated depending on an image capturing scene.

An acceleration sensor detects a gravitational acceleration.

It is difficult to calculate a correct open/close angle because, for example, in a scene of a user walking and image capturing, the acceleration sensor detects an impact of a walking user's foot landing on the ground as a disturbance.

Hereinbelow, interference from the outside to the camera that is unnecessary to calculate the open/close angle is referred to as a "disturbance".

In a case where a correct angle cannot be calculated, it is not possible to switch the displays as expected by a user.

There is a method of removing the disturbance by performing filter processing on the gravitational acceleration acquired from the acceleration sensor to calculate the correct angle.

It is possible to reduce an influence on the gravitational acceleration caused by the disturbance by changing a cutoff frequency of a filter.

On the other hand, there is an issue that responsiveness in the display switching deteriorates because the filter also reduces a changed amount of the gravitational acceleration originally intended to be detected, and the calculated angle becomes smaller.

SUMMARY

The present disclosure determines a vibration state of an imaging apparatus, such as a camera, and changes a filter to be applied to an acceleration sensor based on a determination result.

The present disclosure is directed to an imaging apparatus capable of reducing an influence of a gravitational acceleration variation to switch between a normal display and a reversal display based on an angle and attitude of a display unit, and a control method.

According to some embodiments, an imaging apparatus can include a main body unit, a display unit, a rotation unit configured to rotatably hold the display unit relative to the main body unit, a first acceleration sensor configured to detect a first gravitational acceleration applied to the main body unit, a second acceleration sensor configured to detect a second gravitational acceleration applied to the display unit, an angle calculation unit configured to calculate attitude angles of the main body unit and the display unit from the first gravitational acceleration and the second gravitational acceleration acquired from the first acceleration sensor and the second acceleration sensor, respectively, a display switching unit configured to determine a display state of the display unit based on the attitude angles calculated by the angle calculation unit and switch the display state, and a vibration detection unit configured to detect a vibration applied to the main body unit or the display unit, wherein a calculation method of the attitude angles to be calculated by the angle calculation unit is switched based on a vibration state detected by the vibration-detection unit.

Further features of the present disclosure will become apparent from the following description of exemplary embodiments with reference to the attached drawings.

BRIEF DESCRIPTION OF THE DRAWINGS

FIGS. 3A, 3B, 3C, and 3D are diagrams each illustrating an open/close state of a display unit of the imaging apparatus according to a first exemplary embodiment.

DESCRIPTION OF THE EMBODIMENTS

Hereinbelow, various exemplary embodiments, features, and aspects of the present disclosure will be described in detail with reference to the attached drawings.

Figure 1:
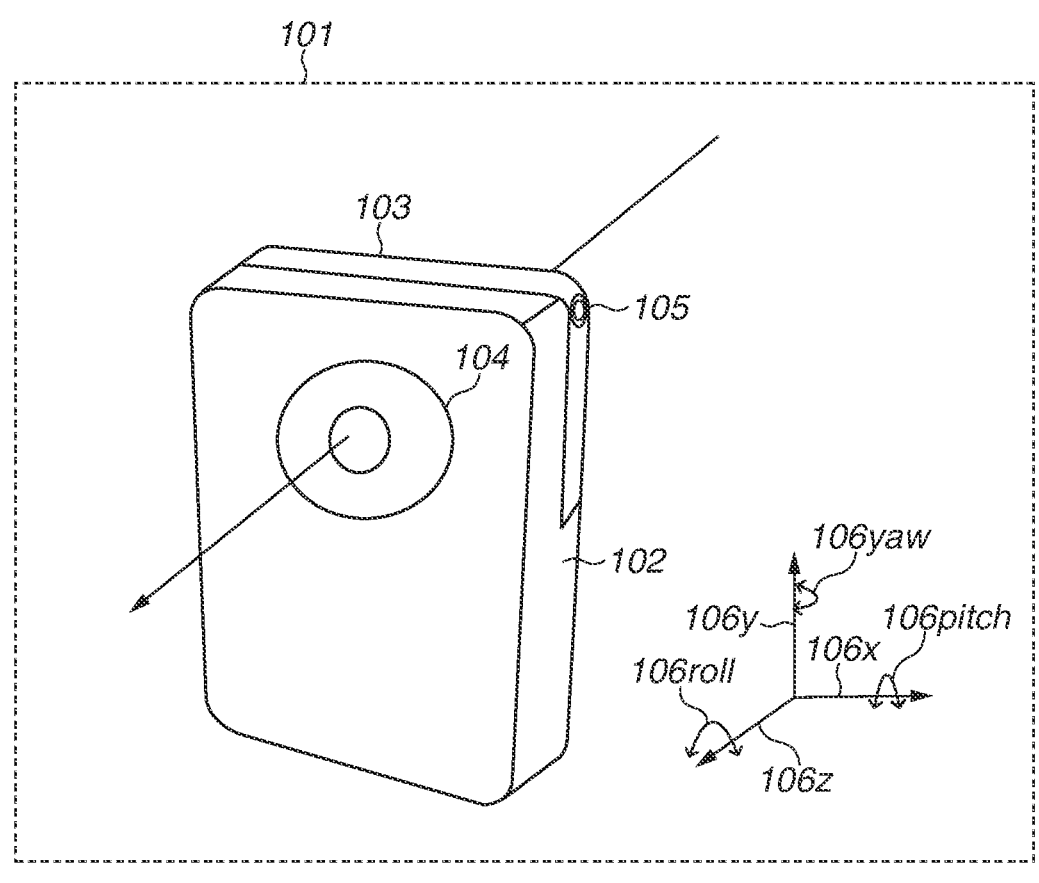
FIG. 1 is a diagram illustrating a configuration of an imaging apparatus and axis directions and rotational directions of an acceleration sensor and an angular velocity sensor according to an exemplary embodiment of the present disclosure.
Figure 2:
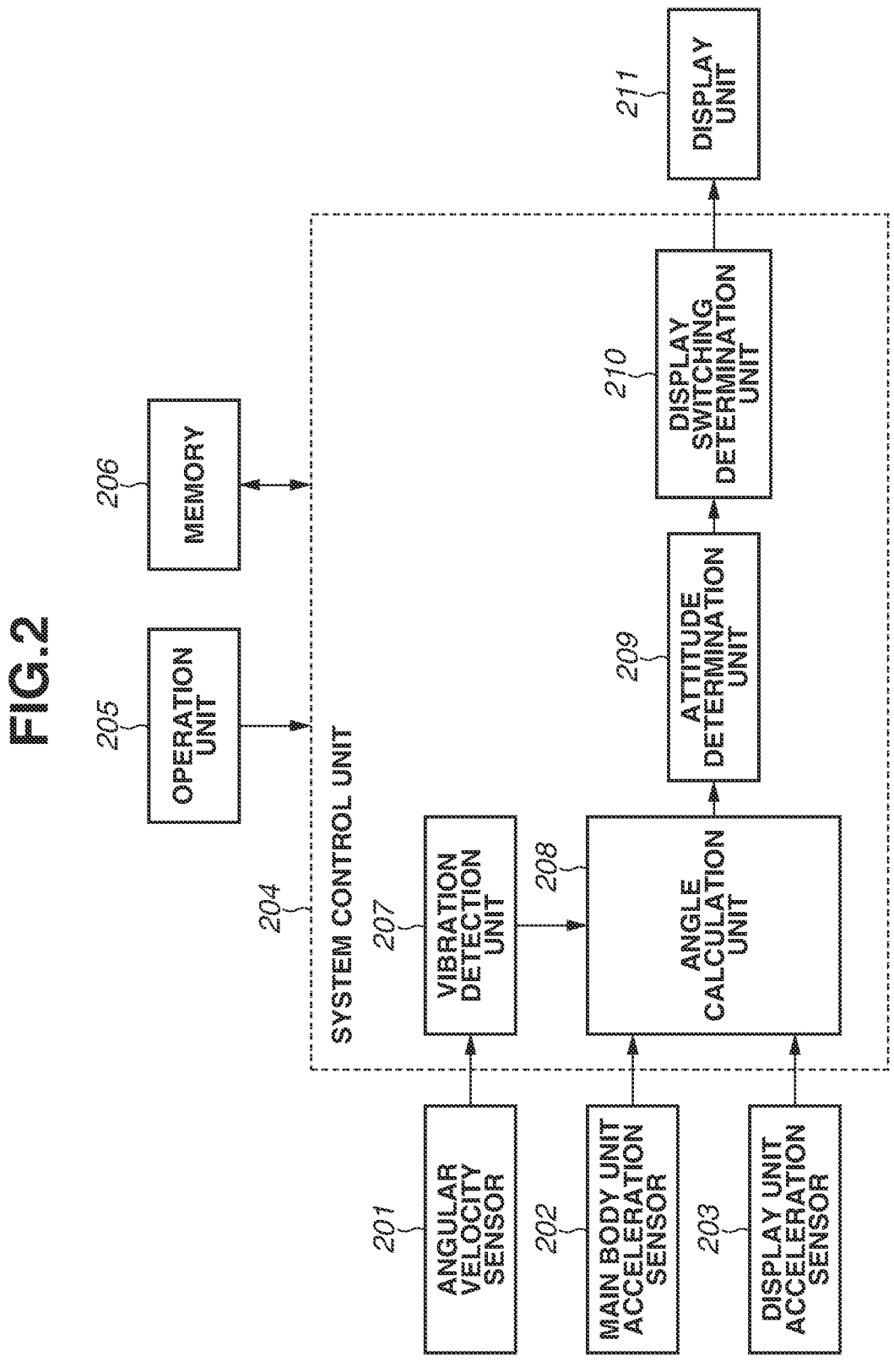
FIG. 2 is a block diagram illustrating the imaging apparatus according to each exemplary embodiment.

FIG. 1 is a diagram illustrating a configuration of an imaging apparatus 101 and definitions of axis directions and rotation directions according to an exemplary embodiment. FIG. 2 is a block diagram of the imaging apparatus 101.
<External Appearance Diagram of Imaging Apparatus>

First, FIG. 1 will be described. FIG. 1 illustrates axes in shake directions and inclination directions that can be detected by an angular velocity sensor 201, a main body unit acceleration sensor 202, and a display unit acceleration sensor 203, illustrated in FIG. 2 described below, that are mounted on the imaging apparatus 101. The imaging apparatus 101 can be configured in the form of a mechanical, digital, or electronic camera, phone, or other device capable of recording, storing, or transmitting an image.

The main body unit acceleration sensor 202 and the display unit acceleration sensor 203 detect accelerations with regard to three axes of axes 106$x$ (X axis), 106$y$ (Y axis), and 106$z$ (Z axis) indicated by arrows.

Further, the angular velocity sensor 201 detects rotations 106$pitch$, 106$yaw$, and 106$roll$ as angular velocities around the axes 106$x$, 106$y$, and 106$z$, respectively.

The imaging apparatus 101 is configured of a main body unit 102 and a display unit 103 connected with each other via a rotation unit 105. The rotation unit 105 enables the display unit 103 to rotate in a direction of the rotation 106$pitch$.

The main body unit 102 includes a lens unit 104 with a direction of the axis 106$z$ as an optical axis.
<Block Diagram>

Next, FIG. 2 will be described. Outputs from the angular velocity sensor 201, the main body unit acceleration sensor 202, and the display unit acceleration sensor 203 are input to a system control unit 204. The main body unit acceleration sensor 202 can be considered a first acceleration sensor, and the display unit acceleration sensor 203 can be considered a second acceleration sensor.

The system control unit 204 includes one or more processors, one or more memories, circuitry, or combinations thereof, and can be configured in the form of a calculation unit or another computing device, such as a central processing unit (CPU), micro processing unit (MPU), or the like.

The system control unit 204 transmits a control instruction to each unit in response to a user's operation via an operation unit 205 to control the entire imaging apparatus 101.

The system control unit 204 executes a control program stored in a memory 206.

The angular velocity output from the angular velocity sensor 201 is input to the system control unit 204.

The obtained angular velocity is input to a vibration detection unit 207 to determine a vibration state of the imaging apparatus 101. A determination result is input to an angle calculation unit 208.

Gravitational accelerations output from the main body unit acceleration sensor 202 and the display unit acceleration sensor 203 are input to the system control unit 204. The main body unit acceleration sensor or first acceleration sensor 202 can be configured to detect a first gravitational acceleration applied to the main body unit 102, and the display unit acceleration sensor or second acceleration sensor 203 can be configured to detect a second gravitational acceleration applied to the display unit 103.

In the system control unit 204, the input gravitational accelerations are input to the angle calculation unit 208. The angle calculation unit 208 calculates a relative inclination angle from the input gravitational accelerations.

At this time, in calculating the relative inclination angle, an angle calculation method is switched depending on a determination result of the vibration state input from the vibration detection unit 207. The vibration detection unit 207 can be configured to detect a vibration applied to the main body unit 102 or the display unit 103, wherein a calculation method of the attitude angles to be calculated by the angle calculation unit 208 can be switched based on a vibration state detected by the vibration detection unit 207.

An attitude determination unit 209 determines an attitude of the imaging apparatus 101 based on the calculated inclination angle.

A display switching determination unit 210 determines a display method of displaying information on a display unit 211 depending on the attitude of the imaging apparatus 101 determined by the attitude determination unit 209. The display switching determination unit 210 can be configured to determine a display state of the display unit 211 based on the attitude angles calculated by the angle calculation unit 208 and switch the display state.

The operation unit 205 includes a release switch for instructing an imaging start, and a touch panel and operation switches for performing settings of the imaging apparatus 101 and switching modes of the imaging apparatus 101. An operation signal of the operation unit 205 is transmitted to the system control unit 204.

The display unit 211 includes a liquid crystal display (LCD) or the like to display a captured image (image data) and specific information (e.g., image capturing information).

The display unit 211 is disposed at an upper portion on the back side of the imaging apparatus 101 with the rotation unit 105 at an uppermost portion of the imaging apparatus 101.

With this configuration, a user can rotate the display unit 211 around the axis 106$x$ at will, and when a position at which no rotation is performed is set as 0 degrees, the display unit 211 can be rotated up to 180 degrees.

Thus, the display unit 103 can be adjusted to a position at which a user can easily view the display unit 103 depending on a situation.

Hereinbelow, each of the exemplary embodiments will be described.
<Open/Close of Display Unit 103>

First, in a first exemplary embodiment, a description is given of an example in which an angle calculation method is switched depending on a state of the imaging apparatus 101.

FIGS. 3A, 3B, 3C, and 3D each illustrate the imaging apparatus 101 including a main body unit 301, a lens unit 302, and a display unit 303 of the imaging apparatus 101, viewed from a side. In this case, a main body acceleration sensor 304 and a display unit acceleration sensor 305 are mounted at positions illustrated in each of FIGS. 3A, 3B, 3C, and 3D. The main body unit 301 corresponds to the main body unit 102 in FIG. 1, the lens unit 302 corresponds to the lens unit 104 in FIG. 1, and the display unit 303 corresponds to the display unit 103 in FIG. 1.

FIG. 3A illustrates the display unit 303 in a closed state in which the open/close angle is 0 degrees.

In this state, the display unit 303 of the imaging apparatus 101 can open up to 180 degrees.

FIG. 3B is a diagram illustrating a case where the open/close angle of the display unit 303 is 90 degrees, and FIG. 3C is a diagram illustrating a case where the open/close angle of the display unit 303 is 135 degrees.

When the display unit 303 is opened to 180 degrees, the open/close angle of the display unit 303 becomes as illustrated in FIG. 3D.

The imaging apparatus 101 includes acceleration sensors respectively in the main body unit 102 and the display unit 103.

The angle calculation unit 208 calculates inclinations of the main body unit 102 and the display unit 103 from the gravitational accelerations obtained respectively from the acceleration sensors to calculate a relative angle of the display unit 103 with respect to the main body unit 102.

In FIGS. 3A, 3B, 3C, and 3D, the display unit 103 opens and closes with respect to the main body unit 102 in a tilt direction.

The inclination angle in the tilt direction can be calculated using a formula (1).

$$\text{Inclination angle (deg)} = \tag{1}$$
$$\text{Arctan}(Z\text{−axis acceleration} \div Y\text{−axis acceleration}) \times 180 \div \pi$$

By calculating the inclinations of the main body unit 102 and the display unit 103 using the formula (1), the relative open/close angle of the display unit 103 with respect to the main body unit 102 can be calculated using a formula (2).

$$\text{Open/close angle (deg)} = \tag{2}$$
$$\text{Display unit inclincation angle − Main body inclincation angle}$$

Based on the value of the open/close angle obtained in this way, the display switching determination unit 210 determines a direction of displaying information to be displayed on the display unit 103.

For example, in a case where the open/close angle is 0 degrees, a normal display is performed, and in a case where the open/close angle is 180 degrees, a reversal display (reversed in up/down direction and right/left direction) is performed.

Further, in a case where the open/close angle is between 45 degrees and 135 degrees, the attitude determination unit 209 determines the attitude of the imaging apparatus 101 from the inclination angle of the main body unit 102, and the display switching determination unit 210 determines whether to display information in the normal display or the reversal display depending on the attitude determined by the attitude determination unit 209.

<Display State of Display Unit>

Figure 4A:
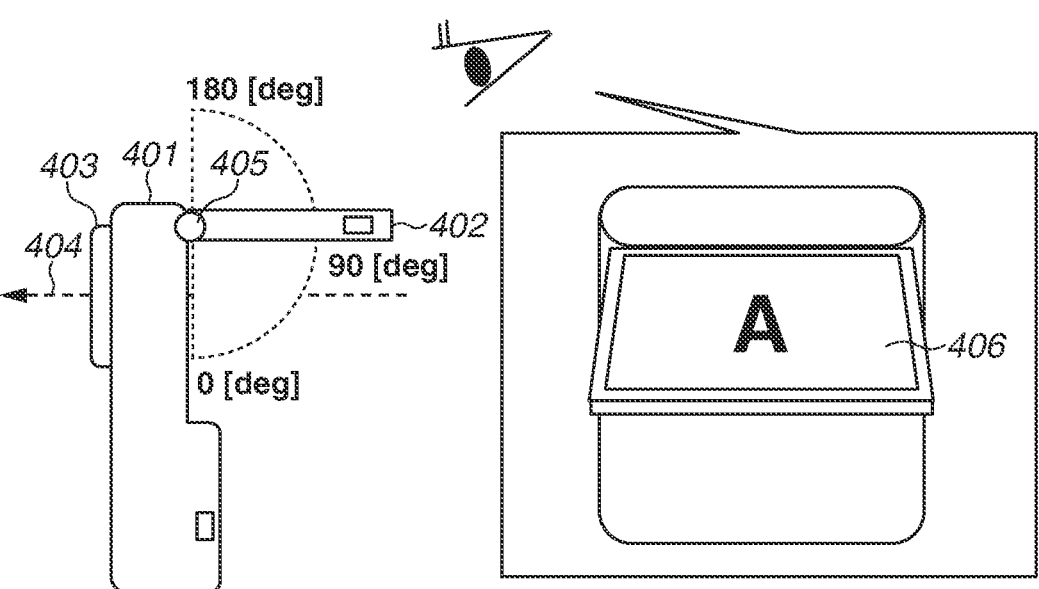
FIGS. 4A and 4B are diagrams each illustrating display on the display unit corresponding to a state of the imaging apparatus according to the first exemplary embodiment.
Figure 4B:
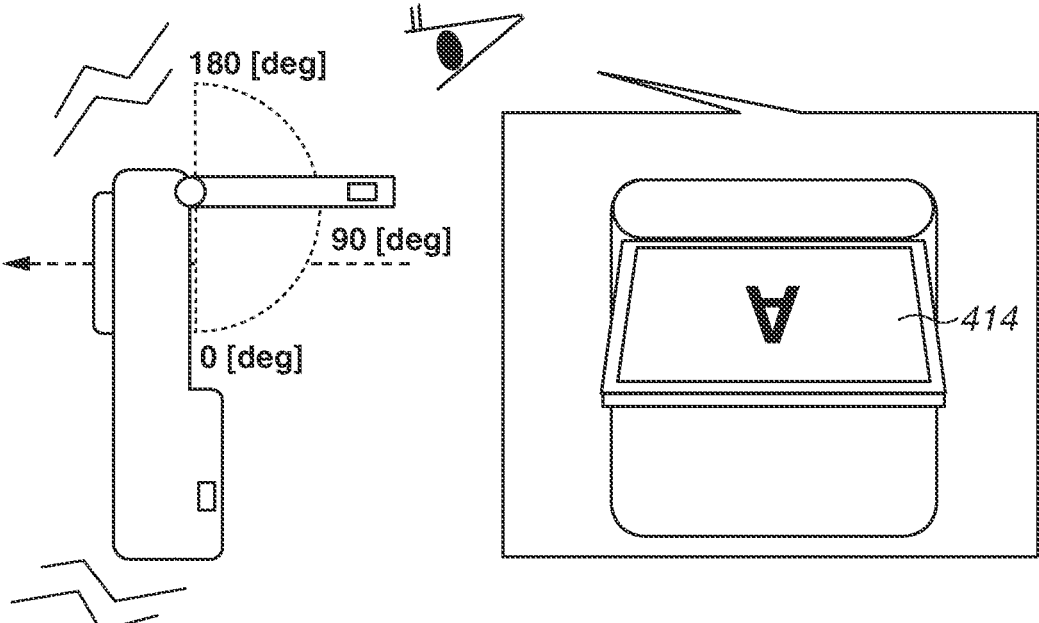

FIGS. 4A and 4B are diagrams each illustrating a display state of the display unit 103 corresponding to a vibration state of the imaging apparatus 101.

In a main body unit 401, a state where an optical axis 404 of a lens unit 403 is parallel to the direction of the axis 106$z$ and a rotation unit 405 is located at an upper portion in a direction of the axis 106$y$ is defined as a main body inclination angle 0 degrees.

Further, the open/close angle of a display unit 402 in a state where the display unit 402 is positioned parallel to the lens unit 403 is defined as 0 degrees. FIGS. 4A and 4B each illustrate a state where the display unit 402 is open 90 degrees.

As illustrated in FIG. 4A, in a case where the open/close angle of the display unit 402 is 90 degrees and the main body inclination angle is 0 degrees, a scene is assumed in which a user holds the imaging apparatus 101 in front of him or her while positioning the imaging apparatus 101 below his or her eye level.

Thus, the display switching determination unit 210 determines that a normal display is to be performed, and the display unit 402 displays normal display information 406.

In addition, the determination method of the main body inclination angle and the display unit open/close angle is merely an example, and the determination method is not limited thereto in an actual embodiment.

In addition, the determination method of determining whether to display information in the normal display or the reversal display is merely an example, and the determination method is not limited thereto in an actual embodiment.

<Example when Vibration is Applied to Imaging Apparatus 101>

FIG. 4B illustrates an example of a case where vibrations are applied to the imaging apparatus 101. Since the vibrations are applied to the imaging apparatus 101, the main body inclination angle calculated from the gravitational acceleration of the main body unit acceleration sensor 202 changes from 0 degrees.

Further, the open/close angle calculated from the gravitational acceleration of the display unit acceleration sensor 203 changes from 90 degrees.

At this time, since the main body unit acceleration sensor 202 and the display unit acceleration sensor 203 are mounted at different positions, the inclination angles that change due to the vibrations are not necessarily the same.

In a case where the inclination angles that change due to the vibrations are not the same, the calculated open/close angle may shift from that in a state where no vibration is applied, and a result of the display switching determination unit 210 may change.

Reversal display information 414 is displayed on the display unit 402 that has been performing the normal display, which causes a demerit that it becomes difficult for the user to view the information displayed on the display unit 402. This demerit is dealt with using a method illustrated in FIG. 6 described below.

<Processing Performed in Steps S501 to S512 by Vibration Detection Unit 207>

Figure 5:
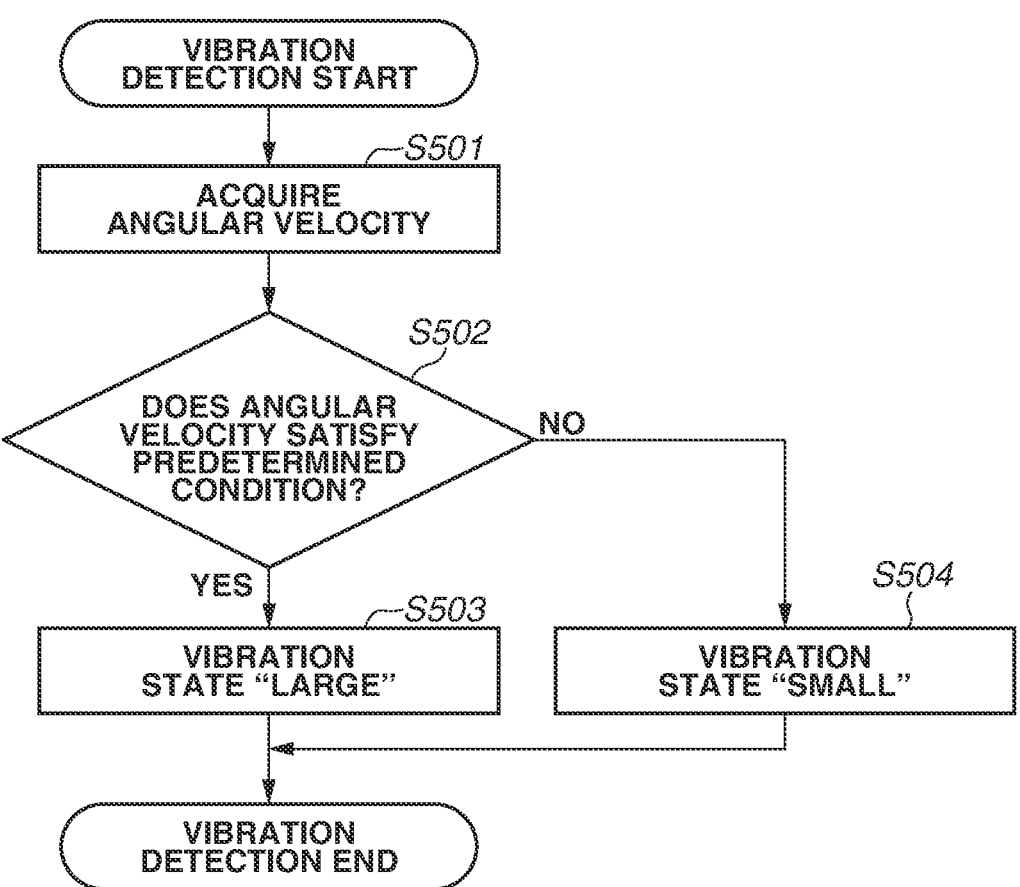
FIG. 5 is a flowchart illustrating processing performed by a vibration detection unit corresponding to the state of the imaging apparatus according to the first exemplary embodiment.

With reference to a flowchart illustrated in FIG. 5, processing performed in steps S501 to S512 by the vibration detection unit 207 in the present exemplary embodiment will be described.

In step S501, the vibration detection unit 207 acquires an angular velocity from the angular velocity sensor 201.

In step S502, the vibration detection unit 207 determines whether the acquired angular velocity satisfies a predetermined condition.

The predetermined condition refers to a condition where the amplitude of the angular velocity detected by the angular velocity sensor 201 is a predetermined threshold value or more.

In a case where the amplitude is the predetermined threshold value or more in step S502 (YES in step S502), the processing proceeds to step S503. In step S503, the vibration detection unit 207 determines that the vibration state is "large". In a case where the amplitude is less than the predetermined value in step S502 (NO in step S502), the processing proceeds to step S504. In step S504, the vibration detection unit 207 determines that the vibration state is "small".

The determination condition of the vibration state described above is merely an example, and the determination condition is not limited thereto in an actual embodiment.

As another example, the vibration detection unit 207 may determine not only based on the amplitude with regard to the vibration but also based on a time period as the vibration state determination condition of the imaging apparatus 101.

In this case, when the amplitude of the predetermined value or more continues for a predetermined time period or more, the vibration detection unit 207 determines that the vibration state is "large".

Otherwise, the vibration detection unit 207 determines that the vibration state is "small".

<Processing Performed in Steps S601 to S612 by Angle Calculation Unit 208>

Figure 6:
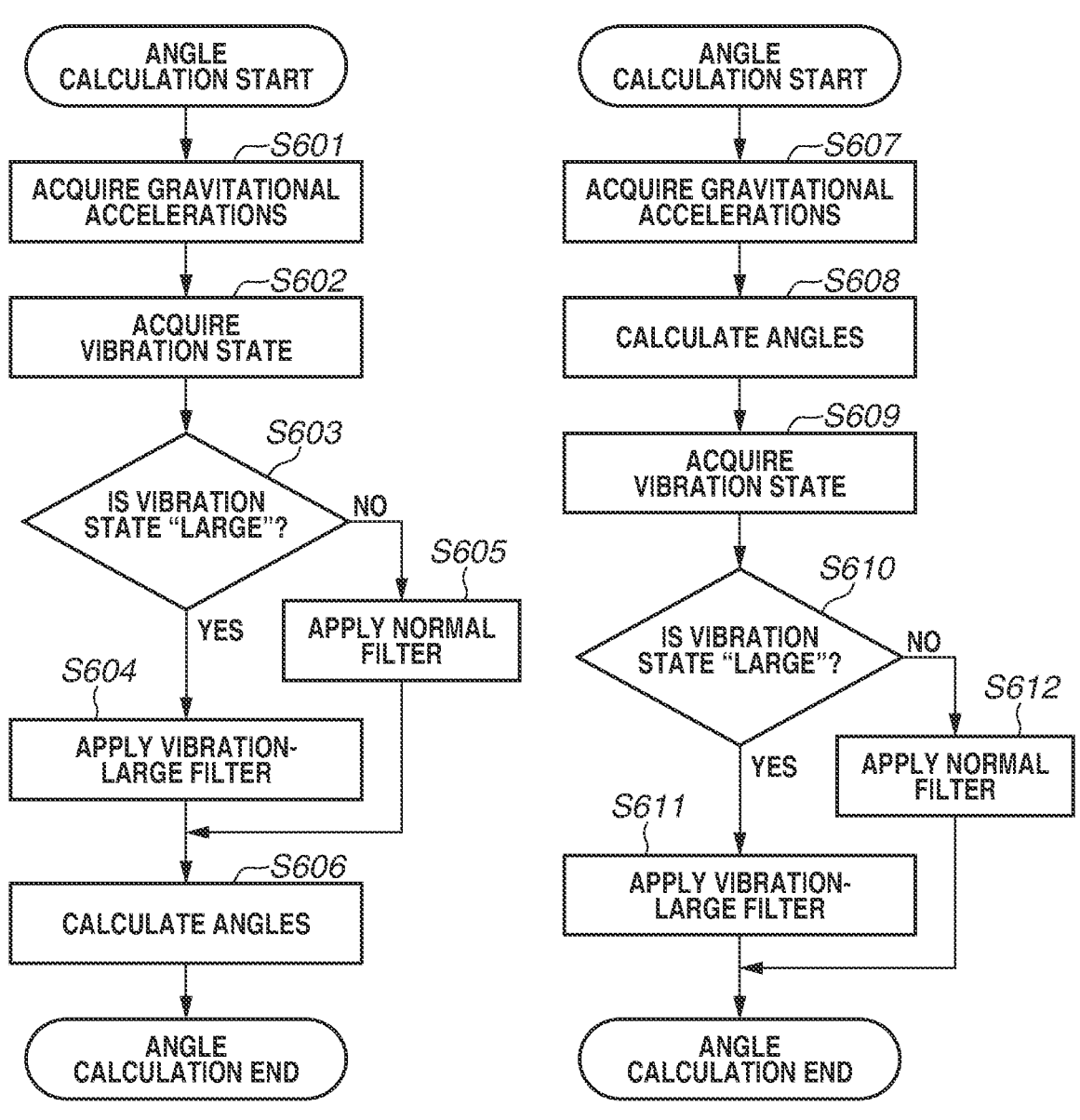
FIG. 6 is a flowchart illustrating processing performed by an angle calculation unit corresponding to the state of the imaging apparatus according to the first exemplary embodiment.

With reference to a flowchart illustrated in FIG. 6, processing performed in steps S601 to S612 by the angle calculation unit 208 in the present exemplary embodiment will be described.

In step S601, the angle calculation unit 208 acquires gravitational accelerations using the main body unit acceleration sensor 202 and the display unit acceleration sensor 203.

Next, in step S602, the angle calculation unit 208 acquires the vibration state detected by the vibration detection unit 207.

In step S603, the angle calculation unit 208 determines whether the vibration state acquired in step S602 is "large". In a case where the vibration state is "large" (YES in step S603), the processing proceeds to step S604. In step S604, a vibration-large filter is applied to the acquired gravitational accelerations.

In a case where the vibration state is "small" (NO in step S603), the processing proceeds to step S605. In step S605, a normal filter is applied to the acquired gravitational accelerations. The normal filter performs filter processing for removing noise caused by the disturbance on the acquired gravitational accelerations.

As an example of the normal filter, a low-pass filter (LPF) of 2 hertz (Hz) is applied to the gravitational accelerations.

A LPF of 0.5 Hz is applied to the gravitational accelerations as the vibration-large filter.

It is possible to prevent a sharp change of the gravitational accelerations caused by the vibrations by applying the LPF with a cutoff frequency lower than that of the normal filter as the vibration-large filter.

Thus, it is possible to prevent the screen from flickering caused by frequent switching between the normal display and the reversal display displayed on the display unit 103 by the gravitational accelerations shapely changing.

In addition, the cutoff frequency of the normal filter and the cutoff frequency of the vibration-large filter are merely examples, and the cutoff frequencies are not limited thereto in an actual embodiment.

After the filter processing is performed on the gravitational accelerations in step S604 or step S605, in step S606, the angle calculation unit 208 calculates angles using the filter-processed gravitational accelerations.

As above, the description is given of the example of performing the filter processing on the acquired gravitational accelerations, but the filter processing is not limited thereto in an actual embodiment.

As another example, the filter processing may be performed on angles obtained by calculating the angles from the gravitational accelerations.

In step S607, the angle calculation unit 208 acquires the gravitational accelerations using the main body unit acceleration sensor 202 and the display unit acceleration sensor 203.

Next, in step S608, the angle calculation unit 208 calculates angles using the acquired gravitational accelerations. Next, in step S609, the angle calculation unit 208 acquires the vibration state detected by the vibration detection unit 207.

In step S610, the angle calculation unit 208 determines whether the vibration state acquired in step S609 is "large". In a case where the vibration state is "large" (YES in step S610), the processing proceeds to step S611. In step S611, the vibration-large filter is applied to the calculated angles.

In a case where the vibration state is "small" (NO in step S610), the processing proceeds to step S612. In step S612, the normal filter is applied to the calculated angles.

By changing the cutoff frequency of the filter processing in calculating the angles depending on the vibration state as described above, it is possible to calculate the angles to determine the correct display state in the case where the vibration state is "large" without deteriorating the responsiveness in the display switching.

<Graphs Illustrating Calculated Angles and Time Series Change of Display State in Walking and Image Capturing>

Figure 7A:
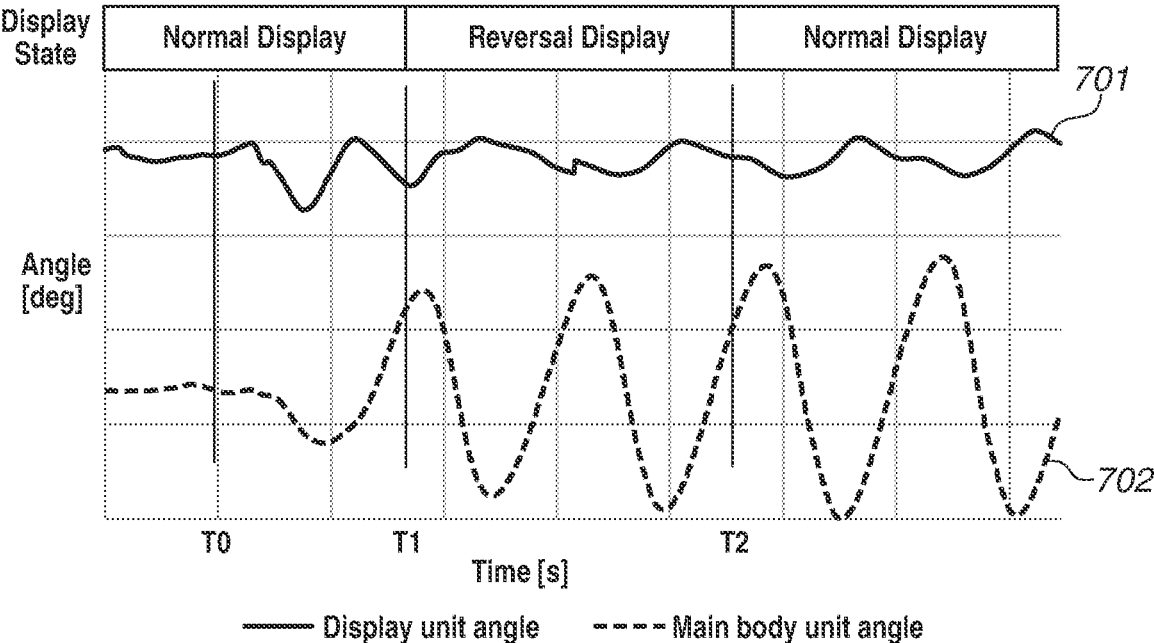
FIGS. 7A and 7B are graphs each illustrating transition of a gravitational acceleration in a state where vibrations are being applied to the imaging apparatus according to the first exemplary embodiment.
Figure 7B:
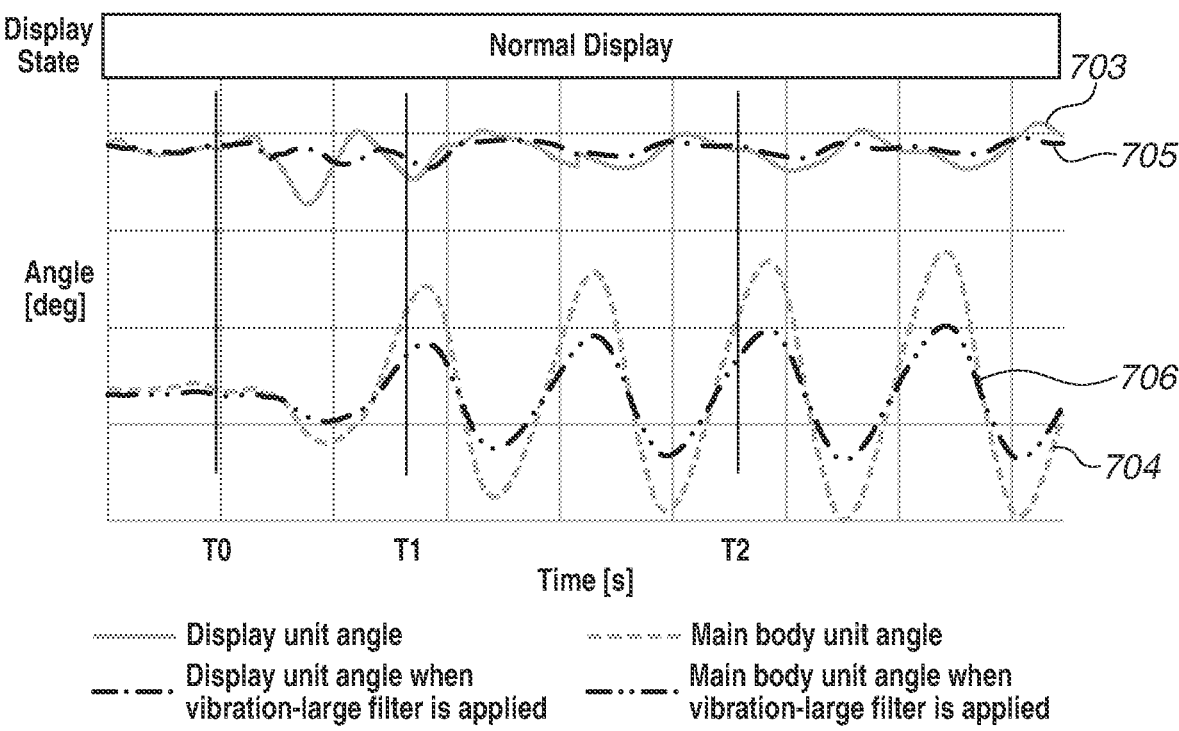

Next, graphs illustrated in FIGS. 7A and 7B will be described. FIGS. 7A and 7B are graphs each illustrating calculated angles and a time-series change of a display state when walking and image capturing is performed using the imaging apparatus 101 with the display unit 103 opened 90 degrees.

A black solid line 701 indicates an angle variation of the display unit 103 calculated in a case where the normal filter is applied without performing the determination in step S603.

A black dashed line 702 indicates an angle variation of the main body unit 102 calculated in the case where the normal filter is applied without performing the determination in step S603.

An upper portion of the graph indicates results determined by the display switching determination unit 210.

The display switching determination unit 210 determines whether to display information on the display unit 103 in the normal display or the reversal display from the calculated angle of the display unit 103 and the calculated angle of the main body unit 102.

In FIGS. 7A and 7B, T0 indicates a time point immediately after starting the walking and image capturing. T1 and T2 each indicate a time point after a certain period of time has elapsed after starting the walking and image capturing.

In FIG. 7A, at the time point T0, the display unit 103 displays the information in the normal display. Then, at the time point T1, the display switches to the reversal display. Then, at the time point T2, the display switches to the normal display again.

FIG. 7B illustrates angles calculated in a case where the vibration-large filter is applied based on the determination in step S603.

Further, a gray solid line 703 indicates an angle variation of the display unit 103 calculated in a case where the normal filter is applied, and a gray broken line 704 indicates an angle variation of the main body unit 102 calculated in a case where the normal filter is applied.

A black dashed-dotted line 705 indicates an angle variation of the display unit 103 calculated using the vibration-large filter.

A black dashed-two dotted line 706 indicates an angle variation of the main body unit 102 calculated using the vibration-large filter.

In this case, at any of the time points T0, T1, and T2, the display unit 103 displays the information in the normal display.

The vibration-large filter reduces errors that occur in calculated angles due to the walking and image capturing, and displays information in the correct display state.

In the first exemplary embodiment, the description is given of the exemplary embodiment in which the vibration-large filter is applied when the vibration state is "large" and the normal filter is applied when the vibration state is "small". However, this configuration is not necessarily the most appropriate for all conceivable embodiments.

For example, in a case where types of the main body unit acceleration sensor 202 of the imaging apparatus 101 and the display unit acceleration sensor 203 of the imaging apparatus 101 are different, characteristics of the acceleration sensors are different. Thus, a range of the detectable gravitational acceleration and its accuracy are determined for each of the acceleration sensors.

Further, mounting positions of the respective acceleration sensors of the main body unit 102 and the display unit 103 are different. Depending on the mounting positions, noises affecting the acceleration sensors vary.

Accordingly, the filter to be applied to each of the acceleration sensors is desirably a filter determined in consideration of the characteristic of each of the acceleration sensors.

Figure 8:
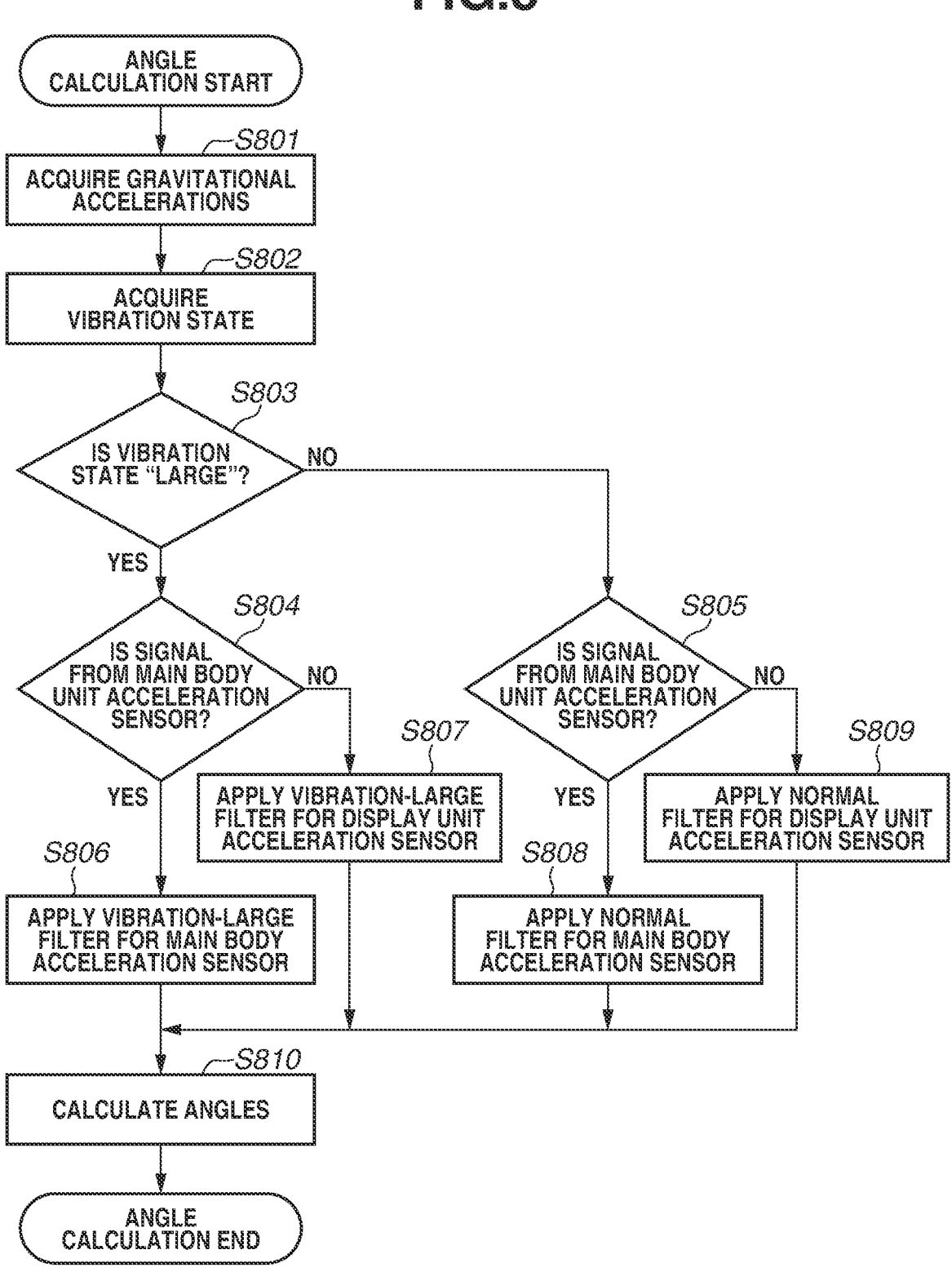
FIG. 8 is a flowchart illustrating processing performed by an angle calculation unit corresponding to a state of an imaging apparatus according to a second exemplary embodiment.

For this reason, a second exemplary embodiment that switches the angle calculation method to an optimum method will be describe with reference to FIG. 8.

<Switching to Optimum Angle Calculation Method>

In step S801, the angle calculation unit 208 acquires gravitational accelerations from the main body unit acceleration sensor 202 and the display unit acceleration sensor 203. Next, in step S802, the angle calculation unit 208 acquires the vibration state detected by the vibration detection unit 207.

In step S803, the angle calculation unit 208 determines whether the vibration state acquired in step S802 is "large".

In a case where the vibration state is "large" (YES in step S803), the processing proceeds to step S804. In step S804, the angle calculation unit 208 determines whether the acquired gravitational acceleration is acquired from the main body unit acceleration sensor 202 or the display unit acceleration sensor 203.

In a case where the acquired gravitational acceleration is acquired from the main body unit acceleration sensor 202 (YES in step S804), the processing proceeds to step S806. In step S806, the angle calculation unit 208 performs, on the acquired gravitational acceleration, the vibration-large filter processing in consideration of the characteristic of the main body unit acceleration sensor 202.

In a case where the acquired gravitational acceleration is acquired from the display unit acceleration sensor 203 (NO in step S804), the processing proceeds to step S807. In step S807, the angle calculation unit 208 performs, on the acquired gravitational acceleration, the vibration-large filter processing in consideration of the characteristic of the display unit acceleration sensor 203.

In step S803, in a case where the vibration state is "small" (NO in step S803), the processing proceeds to step S805.

In step S805, the angle calculation unit 208 determines whether the acquired gravitational acceleration is acquired from the main body unit acceleration sensor 202 or the display unit acceleration sensor 203.

In a case where the acquired gravitational acceleration is acquired from the main body unit acceleration sensor 202 (YES in step S805), the processing proceeds to step S808. In step S808, the angle calculation unit 208 performs, on the acquired gravitational acceleration, the normal filter processing in consideration of the characteristic of the main body unit acceleration sensor 202.

In a case where the acquired gravitational acceleration is acquired from the display unit acceleration sensor 203 (NO in step S805), the processing proceeds to step S809. In step S809, the angle calculation unit 208 performs, on the acquired gravitational acceleration, the normal filter processing in consideration of the characteristic of the display unit acceleration sensor 203.

It is possible to reduce a level of difficulty of designing on a substrate by employing the display state switching method using the acceleration sensors.

In this case, the robustness and the temperature characteristics of the acceleration sensors to be mounted can be selected depending on the mounting positions thereof on the substrate.

For example, in a case of a mounting position near a heat source, it is possible to accurately detect an acceleration even in a case where a temperature change occurs by selecting an acceleration sensor with a high temperature-resistance characteristic.

Further, by mounting the acceleration sensor in a position with a little disturbance, it is possible to use an acceleration sensor with low robustness.

In steps S806 to S809 described above, the filters are switched depending on the vibration state of the imaging apparatus 101 and the characteristic of each of the acceleration sensors.

As an example, the mounting position of the display unit acceleration sensor 203 is different from the mounting position of the main body unit acceleration sensor 202, and the display unit acceleration sensor 203 is mounted on the display unit 103 including the rotation unit 105.

Since the display unit 103 includes the rotation unit 105, in a case where vibrations are applied to the imaging apparatus 101, the vibrations applied to the display unit acceleration sensor 203 may be larger than the vibrations applied to the main body unit acceleration sensor 202.

As an example, a case is considered where the walking and image capturing is performed in a state where the display unit 103 is opened 90 degrees.

The mounting position of the display unit acceleration sensor 203 is different from the mounting position of the main body unit acceleration sensor 202, and the display unit acceleration sensor 203 is mounted on the display unit 103 including the rotation unit 105. In the walking and image capturing, various vibrations caused by a hand shake and walking transmit to the imaging apparatus 101 as camera shakes.

Among these vibrations, considering vibrations generated by landing of a foot on the ground when a user is walking as an example, an impact of the landing transmits to the imaging apparatus 101 via the user's body.

While the main body unit acceleration sensor 202 and the display unit acceleration sensor 203 detect the vibrations, the acceleration detected by the display unit acceleration sensor 203 may possibly be larger due to the vibrations in the vertical direction generated by the landing of the foot on the ground since the display unit 103 is in an open state.

In the present exemplary embodiment, an LPF is applied as the filter to be applied.

In consideration of the characteristic depending on the mounting position, the cutoff frequency of the LPF to be applied to the display unit acceleration sensor 203 is set to be lower than the cutoff frequency of the LPF to be applied to the main body unit acceleration sensor 202.

In the present exemplary embodiment, to the main body unit acceleration sensor 202, an LPF with a cutoff frequency of 1 Hz is applied as the vibration-large filter, and to the display unit acceleration sensor 203, an LPF with a cutoff frequency of 0.5 Hz is applied as the vibration-large filter.

Similarly, as the normal filter, the cutoff frequency of the LPF to be applied to the display unit acceleration sensor 203 is set to be lower than the cutoff frequency of the LPF to be applied to the main body unit acceleration sensor 202.

In the present exemplary embodiment, to the main body unit acceleration sensor 202, an LPF with a cutoff frequency of 5 Hz is applied as the normal filter, and to the display unit acceleration sensor 203, an LPF with a cutoff frequency of 2 Hz is applied as the normal filter.

The method of determining the cutoff frequency of the filter applied to each of the acceleration sensors depending on the mounting position has been described above.

However, the method of determining the cutoff frequency is not limited thereto. For example, the cutoff frequency may be determined after checking the actual gravitational acceleration.

Further, the cutoff frequency may be determined based on temperature information inside the imaging apparatus 101. In a case where the imaging apparatus 101 includes a temperature information acquisition unit in the main body unit 102, the temperature inside the main body unit 102 can be measured.

As the temperature information of the main body unit 102 indicates a larger value, the cutoff frequency of the filter is set to be lower.

In this way, it is possible to calculate an angle with higher accuracy than in a case where the cutoff frequency is not changed even in a state where a noise easily affects the acceleration sensor due to a temperature rise.

In addition, the temperature of the imaging apparatus 101 increases as the time elapses from activation.

Accordingly, it is possible, even for the display unit 103 including no temperature information acquisition unit, to calculate the angles with higher accuracy by setting the cutoff frequency of the filter lower as the time from the activation of the imaging apparatus 101 is longer.

Further, in the above description, as a way of switching the angle calculation method, the control parameter of the applied LPF is switched. However, not limited to the LPF, it is apparent that the present disclosure can be applied in a case where another type of filter, such as a band-pass filter (BPF), is applied.

After the filter processing is performed on the gravitational accelerations in any of steps S806 to S809, in step S810, the angle calculation unit 208 calculates the angles using the filer-processed gravitational accelerations.

It is possible to calculate the angles more accurately by applying a filter to which an optimum parameter is set in consideration of the characteristic of each acceleration sensor and switching the angle calculation method.

The above-described method of switching the filter applied to each of the gravitational accelerations is merely an example, and the method is not limited thereto in an actual embodiment.

As another example, after calculating an angle from each of the gravitational accelerations, it is possible to switch the filter processing performed on the calculated angle.

The features of the first and second exemplary embodiments will be organized and enumerated below.

An imaging apparatus includes a main body unit, a display unit, a rotation unit configured to rotatably hold the display unit relative to the main body unit, a first acceleration sensor configured to detect a first gravitational acceleration applied to the main body unit, and a second acceleration sensor configured to detect a second gravitational acceleration applied to the display unit.

Further, the imaging apparatus includes an angle calculation unit configured to calculate attitude angles of the main body unit and the display unit from the first gravitational acceleration and the second gravitational acceleration acquired from the first acceleration sensor and the second acceleration sensor, respectively.

Further, the imaging apparatus includes a display switching unit configured to determine a display state of the display unit based on the attitude angles calculated by the angle calculation unit and switch the display state, and a vibration detection unit configured to detect a vibration applied to the main body unit or the display unit.

Then, a calculation method of the attitude angles to be calculated by the angle calculation unit is switched based on a vibration state detected by the vibration detection unit.

The second feature will be described below.

The angle calculation unit includes a low-pass filter.

The vibration detection unit detects the vibration state of a vibration applied to the imaging apparatus, and a cutoff frequency of the low-pass filter in a case where the vibration state is large is set to be lower than a cutoff frequency of the low-pass filter in a case where the vibration state is small.

The third feature will be described below.

The first acceleration sensor configured to detect the first gravitational acceleration applied to the main body unit and the second acceleration sensor configured to detect the second gravitational acceleration applied to the display unit detect the gravitational accelerations using similar acceleration sensors.

The fourth feature will be described below.

The angle calculation unit includes a temperature information acquisition unit configured to acquire temperature information inside the imaging apparatus, and an elapsed time acquisition unit configured to acquire an elapsed time from an activation time of the imaging apparatus.

The temperature information acquisition unit is arranged at a position nearer to the first acceleration sensor than to the second acceleration sensor.

Using the temperature information inside the imaging apparatus acquired by the temperature information acquisition unit, the cutoff frequency of the low-pass filter to be applied to the first acceleration sensor when the temperature information is large is set to be lower than the cutoff frequency of the low-pass filter when the temperature information is small.

Alternatively, using the elapsed time acquired by the elapsed time acquisition unit, the cutoff frequency of the low-pass filter to be applied to the first acceleration sensor when the elapsed time acquired by the elapsed time acquisition unit is long is set to be lower than the cutoff frequency of the low-pass filter when the elapsed time is short.

The cutoff frequency of the low-pass filter to be applied to the second acceleration sensor when the elapsed time from the activation time acquired by the elapsed time acquisition unit is long is set to be lower than the cutoff frequency of the low-pass filter when the elapsed time is short.

In the above-described exemplary embodiments, the description is given of the method of determining the vibration state of the imaging apparatus 101 from the angular velocity signal detectable by the angular velocity sensor 201, as the vibration detection unit.

However, as the vibration detection unit, the main body unit acceleration sensor 202 or the display unit acceleration sensor 203 may be used to determine the vibration state of the imaging apparatus 101.

In the first and second exemplary embodiments, the description is given of the case where, even in the case where the disturbance applied to the imaging apparatus 101 is large, the more accurate angle can be calculated by setting the cutoff frequency of the filter to be low.

However, applying the method to all conceivable embodiments may not be effective as the angle may not always be calculated accurately and the switching of the display state of the display unit 103 may not always be performed as expected by the user.

For example, there may be a case where, even when the vibration-large filter is applied in the scene of a user walking and image capturing, a vibration stronger than vibrations generated by the landing of the user's foot on the ground in the normal walking may be applied to the imaging apparatus 101 if a road along which the user is walking is in a poor condition due to road irregularities or the like.

At this time, even if the vibration-large filter is applied, the angle becomes larger due to the applied strong vibration.

If the angle becomes larger, the display state of the screen may be switched during the walking and image capturing when the user does not want the display state to be switched, and switching of the display state may not be performed as expected by the user.

Thus, with reference to FIGS. 9 and 10, a third exemplary embodiment in which whether to switch the display state is determined will be described.

<Method of Determining Whether to Switch Display State>

Figure 9:
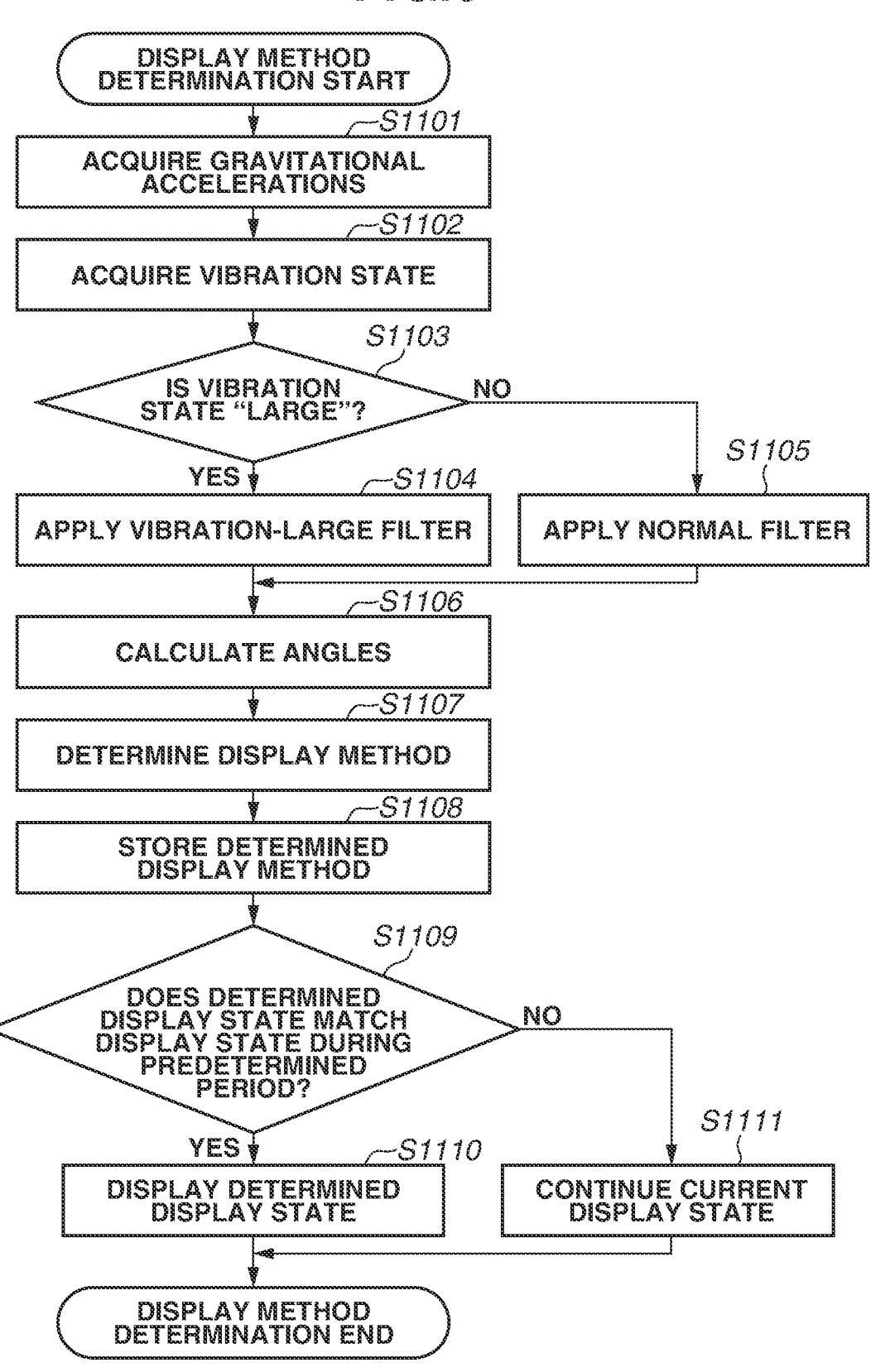
FIG. 9 is a flowchart illustrating processing of determining a display state corresponding to a state of an imaging apparatus according to a third exemplary embodiment.

In FIG. 9, the angle calculation unit 208 calculates the attitude angle in steps S1101 to S1106 similar to steps S601 to S606 according to the first exemplary embodiment.

In step S1107, the display switching determination unit 210 determines the display method, i.e., whether to perform the normal display or the reversal display, based on the angles obtained in step S1106.

In step S1108, the display switching determination unit 210 stores the determined display method in the memory 206.

The memory 206 has an area for storing the display method determined in step S1107 for a predetermined period.

As an example of the predetermined period, in a case where the memory 206 can store the display method for a period of 20 milliseconds (ms) and a display method is determined every 5 ms, the memory 206 stores five determination results of whether to perform the normal display or the reversal display, including the determination result of this time, as the display method.

In step S1109, the display switching determination unit 210 determines whether the display state determined this time matches all the display states stored in the memory 206, with reference to the determination results stored in the memory 206.

In a case where the display state determined this time matches all the display states stored in the memory 206 (YES in step S1109), the processing proceeds to step S1110. In step S1110, the determined display state is displayed.

In a case where the display state determined this time does not match all the display states stored in the memory 206 (NO in step S1109), the processing proceeds to step S1111. In step S1111, the display state determined this time is not displayed, and the current display state is continued.

As above, data on the display state is stored in the memory 206 for previous 20 ms with a determination every 5 ms, but the storage cycle and the storage period are not limited thereto.

Further, as the determination method, the display state is switched to the display state of this time in the case where the display state determined this time matches all the stored display states, but the display states may be switched in a case where the display state determined this time matches half or more of the stored display states.

In this way, it is possible to switch to the display state intended by the user by determining the display state to be displayed with reference to the previous display states, even in the case where the vibrations applied to the imaging apparatus 101 are large.

Further, as a display switching method expected by the user, a method of changing a hysteresis region may be possible.

In many cases, the hysteresis region is provided to set a margin for a threshold value for switching the display state and continue the current display state.

For example, when the open/close angle of 90 degrees is a boundary to switch the display state, if the current display state is in the normal display, the boundary to switch the display state is set to 100 degrees, and the normal display is performed in a region between 90 and 100 degrees.

On the other hand, in a case where the current display state is in the reversal display, the boundary to switch to the normal display is set to 80 degrees, and the reversal display is performed in a region between 80 and 90 degrees.

Figure 10:
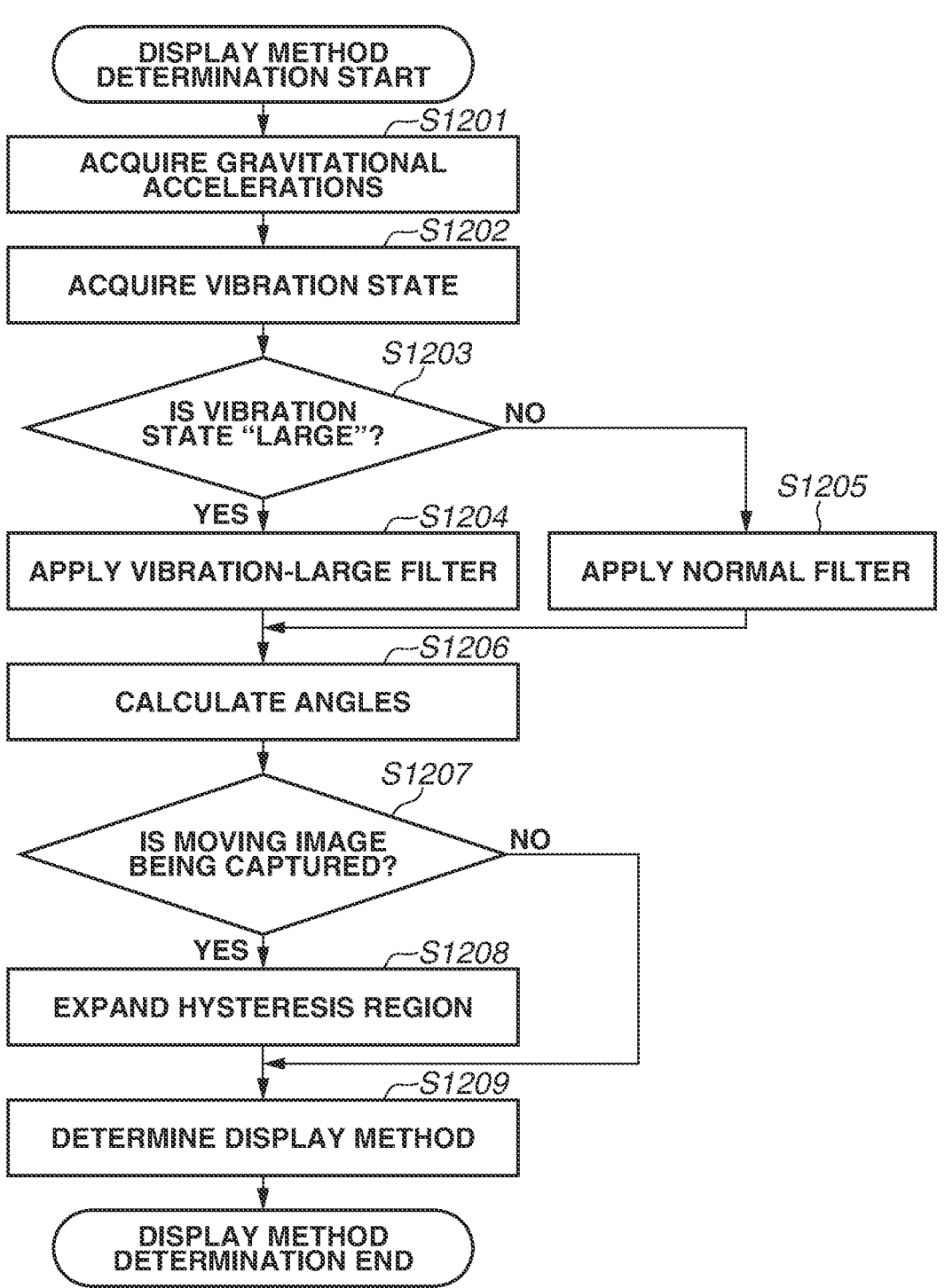
FIG. 10 is a flowchart illustrating processing of determining an open/close angle that determines the display state of the display unit according to the third exemplary embodiment.

In FIG. 10, the angle calculation unit 208 calculates the attitude angles in steps S1201 to S1206 similar to steps S601 to S606 according to the first exemplary embodiment.

The system control unit 204 acquires, from the operation unit 205, control information whether the imaging apparatus 101 is capturing a moving image, and in step S1207, the system control unit 204 determines whether a moving image is being captured.

In step S1207, in a case where the moving image is being captured (YES in step S1207), the processing proceeds to step S1208. In this case, the user usually does not want to switch the display state.

Thus, in step S1208, the system control unit 204 expands the hysteresis region that determines the display state to be larger than the hysteresis region when a moving image is not captured, so that the display state does not frequently change in a case where the attitude angle becomes large due to a large vibration or in a case where the attitude changes during image capturing.

In a case where the moving image is not being captured (NO in step S1207), the processing proceeds to step S1209. In this case, the hysteresis region is not changed.

In step S1209, the system control unit 204 determines the display state based on the attitude angles calculated in step S1206 and the hysteresis region set by the determination in step S1207.

The method of changing the hysteresis region at the time of the moving image capturing has been described above.

However, the condition to change the hysteresis region is not limited thereto. For example, in a case where the vibration applied to the imaging apparatus 101 is large, which is determined using the angular velocity acquired from the angular velocity sensor 201, the hysteresis region may be expanded even though a moving image is not being captured.

The fifth feature according to the third exemplary embodiment will be enumerated below.

The display switching unit includes a display storage unit configured to temporally store the display state determined by the display switching unit, and a response speed setting unit configured to set a display switching response speed.

The display switching unit displays the continued display state in a case where a same display state continues for a predetermined time within a time period set by the response speed setting unit.

Next, the sixth feature will be described below.

The display switching unit includes a moving image recording determination unit configured to determine whether a moving image recording is being performed.

The display switching unit has a function of switching between a first display state and a second display state.

In a case where the moving image recording determination unit determines that the moving image recording is being performed, the display switching unit expands a boundary angle of switching between the first display state and the second display state. Next, the seventh feature will be described below.

The display switching unit expands the boundary angle of switching between the first display state and the second display state in a case where the vibration detected by the vibration detection unit is larger than a predetermined threshold value.

The present disclosure has been described above based on the exemplary embodiments, but the present disclosure is not limited to the specific exemplary embodiments, and various exemplary embodiments in the range without departing from the scope of the present disclosure are included in the present disclosure.

Parts of the above-described exemplary embodiments may be combined.

Further, a case where a software program that implements the functions according to the exemplary embodiments described above is supplied directly from a recording medium or via wired or wireless communication to a system or an apparatus including a computer that can execute the program, and the program is executed by the computer included in the system or the apparatus, is included in the present disclosure.

Accordingly, a program code itself to be supplied and installed in the computer to implement the functional processing according to the present disclosure realizes the present disclosure.

In other words, the computer program itself for implementing the functional processing according to the present disclosure is also included in the present disclosure.

In this case, any form of the computer program can be employed as long as a program function is included, such as an object code, a program executed by an interpreter, and script data supplied to an operating system (OS).

The recording medium for supplying the computer program may be, for example, a magnetic recording medium such as a hard disk drive and a magnetic tape, an optical recording medium, a magnetooptical recording medium, or a non-volatile semiconductor memory.

As a method of supplying the computer program, a method is possible where the computer program realizing the present disclosure is stored in a server on a computer network, and the computer program is downloaded from the server to a client computer connected thereto and executed by the client computer.

Some exemplary embodiments of the present disclosure are described below.

(Configuration 1)

1. An imaging apparatus, comprising:

a main body unit;

a display unit;

a rotation unit configured to rotatably hold the display unit relative to the main body unit;

a first acceleration sensor configured to detect a first gravitational acceleration applied to the main body unit;

a second acceleration sensor configured to detect a second gravitational acceleration applied to the display unit;

an angle calculation unit configured to calculate attitude angles of the main body unit and the display unit from the first gravitational acceleration and the second gravitational acceleration acquired from the first acceleration sensor and the second acceleration sensor, respectively;

a display switching unit configured to determine a display state of the display unit based on the attitude angles calculated by the angle calculation unit and switch the display state; and a vibration detection unit configured to detect a vibration applied to the main body unit or the display unit, wherein a calculation method of the attitude angles to be calculated by the angle calculation unit is switched based on a vibration state detected by the vibration detection unit.

(Configuration 2)

2. The imaging apparatus according to configuration 1, wherein the angle calculation unit includes a low-pass filter, wherein the vibration detection unit detects the vibration state of a vibration applied to the imaging apparatus, and wherein a cutoff frequency of the low-pass filter in a case where the vibration state is large is set to be lower than a cutoff frequency of the low-pass filter in a case where the vibration state is small.

(Configuration 3)

3. The imaging apparatus according to configuration 1 or 2, wherein the first acceleration sensor configured to detect a first gravitational acceleration applied to the main body unit and the second acceleration sensor configured to detect a second gravitational acceleration applied to the display unit detect the gravitational accelerations using similar acceleration sensors.

(Configuration 4)

4. The imaging apparatus according to any one of configurations 1 to 3, wherein the angle calculation unit includes a temperature information acquisition unit configured to acquire temperature information inside the imaging apparatus, and an elapsed time acquisition unit configured to acquire an elapsed time from an activation time of the imaging apparatus, wherein the temperature information acquisition unit is arranged at a position nearer to the first acceleration sensor than to the second acceleration sensor, wherein, using the temperature information inside the imaging apparatus acquired by the temperature information acquisition unit, the cutoff frequency of the low-pass filter to be applied to the first acceleration sensor when the temperature information is large is set to be lower than the cutoff frequency of the low-pass filter when the temperature information is small, or, using the elapsed time acquired by the elapsed time acquisition unit, the cutoff frequency of the low-pass filter to be applied to the first acceleration sensor when the elapsed time acquired by the elapsed time acquisition unit is long is set to be lower than the cutoff frequency of the low-pass filter when the elapsed time is short, and wherein the cutoff frequency of the low-pass filter to be applied to the second acceleration sensor when the elapsed time from the activation time acquired by the elapsed time acquisition unit is long is set to be lower than the cutoff frequency of the low-pass filter when the elapsed time is short.

(Configuration 5)

5. The imaging apparatus according to any one of configurations 1 to 4, wherein the display switching unit includes a display storage unit configured to temporally store the display state determined by the display switching unit, and a response speed setting unit configured to set a display switching response speed, and wherein the display switching unit displays the continued display state in a case where a same display state continues for a predetermined time within a time period set by the response speed setting unit.

(Configuration 6)

6. The imaging apparatus according to any one of configurations 1 to 5, wherein the display switching unit includes a moving image recording determination unit configured to determine whether a moving image recording is being performed, wherein the display switching unit has a function of switching between a first display state and a second display state, and wherein, in a case where the moving image recording determination unit determines that the moving image recording is being performed, the display switching unit expands a boundary angle of switching between the first display state and the second display state.

(Configuration 7)

7. The imaging apparatus according to any one of configurations 1 to 6, wherein the display switching unit expands the boundary angle of switching between the first display state and the second display state in a case where the vibration detected by the vibration detection unit is larger than a predetermined threshold value.

(Configuration 8)

8. A control method for an imaging apparatus including a main body unit, a display unit, a rotation unit configured to rotatably hold the display unit relative to the main body unit, a first acceleration sensor configured to detect a first gravitational acceleration applied to the main body unit, a second acceleration sensor configured to detect a second gravitational acceleration applied to the display unit, an angle calculation unit configured to calculate attitude angles of the main body unit and the display unit from the first gravitational acceleration and the second gravitational acceleration acquired from the first acceleration sensor and the second acceleration sensor, respectively, a display switching unit configured to determine a display state of the display unit based on the attitude angles calculated by the angle calculation unit and switch the display state, a vibration detection unit configured to detect a vibration applied to the main body unit or the display unit, the control method comprising:

switching a calculation method of the attitude angles to be calculated by the angle calculation unit based on the vibration state detected by the vibration detection unit.

According to the present disclosure, even in a case where vibrations are large, responsiveness in display switching does not deteriorate. Therefore, it is possible to provide an imaging apparatus that can switch between a normal display and a reversal display based on an angle or an attitude of a display unit while suppressing variations of a gravitational acceleration.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors, circuitry, or combinations thereof (e.g., central processing unit (CPU), micro processing unit (MPU), or the like), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-065731, filed Apr. 13, 2023, which is hereby incorporated by reference herein in its entirety.

What is claimed is:

1. An imaging apparatus, comprising:
a main body;
a display;
a display holder configured to rotatably hold the display relative to the main body;
a first acceleration sensor configured to detect a first gravitational acceleration applied to the main body;
a second acceleration sensor configured to detect a second gravitational acceleration applied to the display;
an angle calculator configured to include a low-pass filter, and to calculate an attitude angle of the main body based on the first gravitational acceleration and an attitude angle of the display based on the second gravitational acceleration; and
a display switch configured to switch a display state of the display based on the attitude angle of the main body and the attitude angle of the display,
wherein a cutoff frequency of the low-pass filter in a large vibration state is set to be lower than a cutoff frequency of the low-pass filter in a small vibration state.

2. The imaging apparatus according to claim 1, wherein the first acceleration sensor and the second acceleration sensor detect the gravitational accelerations using similar acceleration sensors.

3. The imaging apparatus according to claim 1,
wherein the angle calculator includes a temperature information acquisition unit configured to acquire temperature information inside the imaging apparatus, and an elapsed time acquisition unit configured to acquire an elapsed time from an activation time of the imaging apparatus,
wherein the temperature information acquisition unit is arranged at a position nearer to the first acceleration sensor than to the second acceleration sensor,
wherein, using the temperature information inside the imaging apparatus acquired by the temperature information acquisition unit, the cutoff frequency of the low-pass filter to be applied to the first acceleration sensor when the temperature information is large is set to be lower than the cutoff frequency of the low-pass filter when the temperature information is small, or, using the elapsed time acquired by the elapsed time acquisition unit, the cutoff frequency of the low-pass filter to be applied to the first acceleration sensor when the elapsed time acquired by the elapsed time acquisition unit is long is set to be lower than the cutoff frequency of the low-pass filter when the elapsed time is short, and

wherein the cutoff frequency of the low-pass filter to be applied to the second acceleration sensor when the elapsed time from the activation time acquired by the elapsed time acquisition unit is long is set to be lower than the cutoff frequency of the low-pass filter when the elapsed time is short.

4. The imaging apparatus according to claim 1,
wherein the display switch includes a display storage unit configured to temporally store the display state determined by the display switcher, and a response speed setting unit configured to set a display switching response speed, and
wherein the display switcher displays the continued display state in a case where a same display state continues for a predetermined time within a time period set by the response speed setting unit.

5. The imaging apparatus according to claim 1,
wherein the display switcher includes a moving image recording determination unit configured to determine whether a moving image recording is being performed,
wherein the display switcher has a function of switching between a first display state and a second display state, and
wherein, in a case where the moving image recording determination unit determines that the moving image recording is being performed, the display switcher expands a boundary angle of switching between the first display state and the second display state.

6. The imaging apparatus according to claim 5, wherein the display switcher expands the boundary angle of switching between the first display state and the second display state in a case where a vibration is larger than a predetermined threshold value.

7. The imaging apparatus according to claim 1, further comprising a vibration detector configured to detect a vibration applied to the main body or the display.

8. A control method for an imaging apparatus including
a main body,
a display,
a display holder configured to rotatably hold the display unit relative to the main body unit,
a first acceleration sensor configured to detect a first gravitational acceleration applied to the main body,
a second acceleration sensor configured to detect a second gravitational acceleration applied to the display,
an angle calculator configured to include a low-pass filter, and to calculate an attitude angle of the main body based on the first gravitational acceleration and an attitude angle of the display based on the second gravitational acceleration,
a display switcher configured to switch a display state of the display based on the attitude angle of the display, and
wherein a cutoff frequency of the low-pass filter in a large vibration state is set to be lower than a cutoff frequency of the low-pass filter in a small vibration state.

* * * * *